(12) United States Patent
Mischke (10) Patent No.: US 7,707,145 B2
(45) Date of Patent: Apr. 27, 2010

(54) METHOD FOR CONTROL, ANALYSIS AND SIMULATION OF RESEARCH, DEVELOPMENT, MANUFACTURING AND DISTRIBUTION PROCESSES

(76) Inventor: Gerald Mischke, Stettener Str. 31, Weinstadt-Endersbach 71384 (DE)

( * ) Notice: Subject to any disclaimer, the term of this patent is extended or adjusted under 35 U.S.C. 154(b) by 1259 days.

(21) Appl. No.: 11/030,286

(22) Filed: Jan. 7, 2005

(65) Prior Publication Data

US 2005/0192947 A1 Sep. 1, 2005

Related U.S. Application Data

(63) Continuation of application No. PCT/EP03/07447, filed on Jul. 9, 2003.

(30) Foreign Application Priority Data

Jul. 9, 2002 (EP) .................................. 02015260

(51) Int. Cl.
*G06F 7/00* (2006.01)
(52) U.S. Cl. .............................. 707/3; 707/8; 707/104.1
(58) Field of Classification Search ........................ None
See application file for complete search history.

(56) References Cited

U.S. PATENT DOCUMENTS

| | | | | |
|---|---|---|---|---|
| 6,192,370 | B1 * | 2/2001 | Primsch ................... | 707/103 R |
| 6,865,567 | B1 * | 3/2005 | Oommen et al. ............... | 707/2 |
| 7,003,504 | B1 * | 2/2006 | Angus et al. .................... | 707/1 |
| 7,370,033 | B1 * | 5/2008 | Roychowdhury .............. | 707/3 |
| 2002/0093980 | A1 * | 7/2002 | Trebes, Jr. ................... | 370/466 |
| 2002/0129032 | A1 * | 9/2002 | Bakalash et al. ............ | 707/101 |
| 2003/0191627 | A1 * | 10/2003 | Au ............................... | 704/9 |
| 2004/0059436 | A1 * | 3/2004 | Anderson et al. .............. | 700/2 |
| 2004/0243593 | A1 * | 12/2004 | Stolte et al. ................. | 707/100 |

\* cited by examiner

*Primary Examiner*—Don Wong
*Assistant Examiner*—Shyue Jiunn Hwa
(74) *Attorney, Agent, or Firm*—Oblon, Spivak, McClelland, Maier & Neustadt, L.L.P (57) ABSTRACT

A method for control, analysis and simulation of research, development, manufacturing and distribution processes, in which the data relevant for describing the process are mapped in a four-dimensional coordinate space with the orthogonal coordinate axes source, sink, object or service and time and are stored in a relational database with tree structure, wherein, for logical connection of the coordinates source, sink and object or service during performance of an analysis or simulation, there are provided a transaction table, in which time-related information on inventory changes of data stored in the coordinates source, sink and object or service is recorded, and a resource table, in which time-related information on costs and capacities of the process under consideration is recorded.

18 Claims, 10 Drawing Sheets

Fig. 3
DATA ARCHITECTURE (DETAIL)
SEPARATION OF ASSIGNMENT INFOS

Fig. 4
THE 4-DIMENSIONAL DATA CUBE IN A 3-D PROJECTION

FIG 5: Analysis and Evaluation Method Business System

FIG 6: IT-System Architecture - distributed BS*-Analysis Tool

FIGURE 8

METHOD FOR CONTROL, ANALYSIS AND SIMULATION OF RESEARCH, DEVELOPMENT, MANUFACTURING AND DISTRIBUTION PROCESSES

BACKGROUND OF THE INVENTION

1. Field of the Invention

The invention relates to a large number of methods and electronic data-processing systems for analysis/representation of management information processes and systems and to a computer-program product for implementing the method.

2. Description of the Related Art

Management information systems (MIS) are an invention of the nineteen sixties. It was at that time, following the triumphs achieved in research centers, that the first attempts were made to apply this technology also for direct support of top management in strategic and leadership tasks. These attempts, as well as the second beginning in the nineteen eighties or early nineteen nineties (executive information systems (EIS)) were not rewarded with too much success.

With the advent and increasing spread of the "data warehouse" (DWH) technique, the 3rd wave of attempts to introduce MIS is now under way. This is taking place mainly under the "management cockpit" concept, on the basis of ultra-modern relational database techniques in combination with the most automated possible integration and aggregation of available on-line information about the corporation in question. This is made possible by the OLTP systems, such as SAP, that have now become widely available. Thus they make it possible to obtain a new quality of insight into and overview of even very large and possibly internationally networked corporations.

The main reason for the failure of the classical MIS technology and such beginnings/attempts in the nineteen sixties, eighties and nineties to also support management decisions and processes directly by electronic data-processing systems lies in the very inadequate degree of formalization and in the sometimes very great variance or variability of management information, processes and concepts. Heretofore management decisions and processes have been hostage to pronounced "modes" both of concepts and methods. However, technical (support) systems necessarily require a stable concept, reference and process framework in order to be able to reasonably work and be effective.

A further critical disadvantage lies in the relational database technique itself. It is merely able to represent 2-digit predicates (such as "x is_child_of y") as tables. The search complexity and search times increase exponentially with the number of relations or tables. Every introduction of a further dimension, classification or structure therefore has a considerable adverse effect on the performance of the overall system. This is a very imposing limitation precisely for very poorly structured domains, such as in management support systems. Quite particularly, these systems are characterized by what is generally an unforeseeable large number of possible structuring features that are expressly desired or needed by the customers or users.

In addition, the existing prior art generally offers no kind of help in classifying such corporations and markets logically and in a manner that will also be stable over prolonged time. In fact, no stable, universally applicable classification system has even been formulated as yet. To the contrary, the many possible structuring features are treated in largely equivalent manner by the electronic data-processing systems and their developers and suppliers. This unnecessarily increases the overall system complexity, prevents portability of results, and makes the systems slow, cumbersome and frequently also impossible to maintain.

A problem that needs to be overcome includes developing a stable, generally valid, simple but also largely universally applicable basic classification for research, development, manufacturing, distribution and other processes. Such a classification must be designed so that it can be easily implemented in an appropriate electronic data-processing support-system architecture. In addition, a suitable flow-control principle based on this (electronic data-processing) architecture must be found for this purpose. Thus it will be necessary to address the problems alluded to in the foregoing: of diversity and ambiguity (resulting from the variability of the control requirements), of the exponential increase in complexity and the associated run-time behavior of the electronic data-processing systems, and of the overall system complexity and operability of such systems from the user's viewpoint.

The inventor has described methods and processes for overcoming the problems of the prior art.

SUMMARY OF THE INVENTION

The invention therefore includes the following objects for an electronic data-processing system for analysis, simulation and control of research, development, manufacturing, distribution, and other processes related thereto:

1. Definition of a "most general" basic classification of a (every) such process system and its electronic data-processing representation.
2. Specification of an associated classification or architecture for a corresponding support electronic data-processing system.
3. Definition of a procedure or method for adapting this "most general" process analysis, simulation and control system to arbitrary "real" process systems of arbitrary complexity.
4. Specification of flow control and of the corresponding system architecture for the associated electronic data-processing system.

DETAILED DESCRIPTION OF THE INVENTION

According to one embodiment of the invention the object including a "most general" basic classification of a process system may be achieved by the strict introduction of a "source-sink-service-time space" principle. By this principle it is possible to map every process system and every process step in 4-dimensional event space. Within this space, sub-zones can be identified as possible optimal or desired state spaces for the process system or the process step. For this purpose, a suitable metric must be defined for this event space. Examples of such a metric in the case of a manufacturing process of a corporation is the traditional P&L statement, or in the case of individual projects/proposals is the plan-to-actual deviation.

In another embodiment of the invention an architecture of the support electronic data-processing system may be achieved by the equally strict introduction of an "atomic data-recording principle" based on the foregoing 4-dimensional classification of the event space/process system in connection with a 5-table architecture of the electronic data-processing system behind it. Individual tables respectively describe and record source, sink and object or service or service class (e.g., R&D projects) of the process system. Together with time or time space, these 3 tables represent, as it were, the 4 basic coordinates of the process system or of the "event space". A further "transaction table" describes the respective atomic transaction (such as the individual job contract, the work package or the furnishing of an individual service), including the time point and duration of the transaction. Together with the "basic coordinates", this table completely describes the variation with time of the process system under consideration. Last but not least, a separate "resource table" classified according to the elements of the 3 "basic coordinates", source, sink, object or service (=transaction class), describes the resources of the process system that are present per time segment or possibly those that have already been utilized. All these tables must be built up atomically. This means that the smallest unit that can be represented or analyzed in the process system must be allocated at least 1 line per entry. Furthermore, the column entries of all tables are strictly separated according to structure or correlation information and according to the inventory or content information describing the "coordinates".

In another embodiment of the invention the "most general" adaptation possible to an arbitrary real process system may include atomic data recording, the 4-dimensional classification and the 5-table architecture with separation of structure and inventory information making it possible, with once again strict "tree classification" of each of the 4 basic coordinates of the event space/process system, to display, to analyze, to simulate and if necessary also to control every arbitrary real system of processes of arbitrary albeit tree-like structure in this electronic data-processing system. For this purpose the principle of strict separation of correlation and inventory or content information is required once again. Only in this way is it possible to control the aggregation of "atomic" individual information (such as work packages or cost centers) logically and unambiguously reproducibly by means of corresponding "correlation trees". Furthermore, the tree classification of each "process system coordinate" guarantees unambiguous representation of arbitrary hierarchical structures. Networks and "hierarchy discontinuities" can usually be resolved and thus described nevertheless by introducing "virtual" intermediate nodes in trees. This method therefore represents the "most general" case of the description of approximately arbitrary process systems by electronic data-processing systems.

In another embodiment of the invention a flow control and overall architecture of the electronic data-processing system may be used to implement a systematic 2-stage overall system architecture and flow control is now possible. In a first step, a process-system section to be considered or analyzed is identified and converted to one or more 4-dimensional (atomic) address vectors by the navigation system, which relates to the tree structures or their electronic data-processing representations (address tables, correlation relations, etc.). With these address vectors, the corresponding entries in the 5 tables (source, sink, object or service, transaction and resources) are retrieved from the electronic data-processing model of the process system and placed in a new intermediate representation corresponding to the analysis query. This intermediate representation (or, as it were, the memory or the intermediate store of the query) is logically organized in a manner analogous to the architecture of the electronic data-processing overall system. On this intermediate store it is now possible, without disturbing the overall system and the stored information, arbitrarily to establish what are usually tree-controlled aggregations and evaluations of the data. For this flow it is completely immaterial whether only one or arbitrarily many classifications (for example, by regions, time segments, technologies, product groups, etc.) is or are involved for one or more of the 4 "coordinates" or "dimensions" of the process system. For an arbitrary analysis or consideration of a process system that is also arbitrary, however, it is always possible to use only one of these classifications as the basis. Multiple views can then be established by juxtaposing a plurality of such considerations. From the system viewpoint it is completely immaterial which is selected, provided only that the principles described in the foregoing are respected.

Each of the aforementioned embodiments may be carried out alone, in any sequence of two or more embodiments, simultaneously or concurrently.

As is easily seen, this electronic data-processing and system architecture solves all prior art problems described hereinabove. Above and beyond this, substantially the same response-time behavior is obtained even in the case of arbitrarily diverse classifications of the process system. This ideal response time behavior occurs because the actual search work for the corresponding entries in the 5-table architecture of the process-information system is in this way independent of the process system itself and of its internal structure. Thus it remains largely constant.

The invention offers a further advantage, which is not to be underestimated as regards its practical importance, in that it permits process systems to be partitioned. These partitions are in turn complete (sub) process systems in the sense of the invention, which if necessary can also be maintained, analyzed, considered and edited on separate subsystems, such as on multiple PC copies of these (sub) process systems. This opens new horizons in modularity, both in manipulation and in treatment/editing of process systems. This is a quite considerable advantage of the (management) information system created in this way, especially for applications in real R&D, manufacturing and distribution process, not to mention for applications in investment processes, where the overall complexity is considerable and in some cases can be comprehended only with great difficulty.

EXAMPLES

The invention will be explained in more detail on the basis of several practical examples in FIGS. 1 to 7. These FIGS. 1 to 7 show examples of the table and process-system structure, of the 4-dimensional data cube and of the associated analysis and flow control.

Figure 1A:
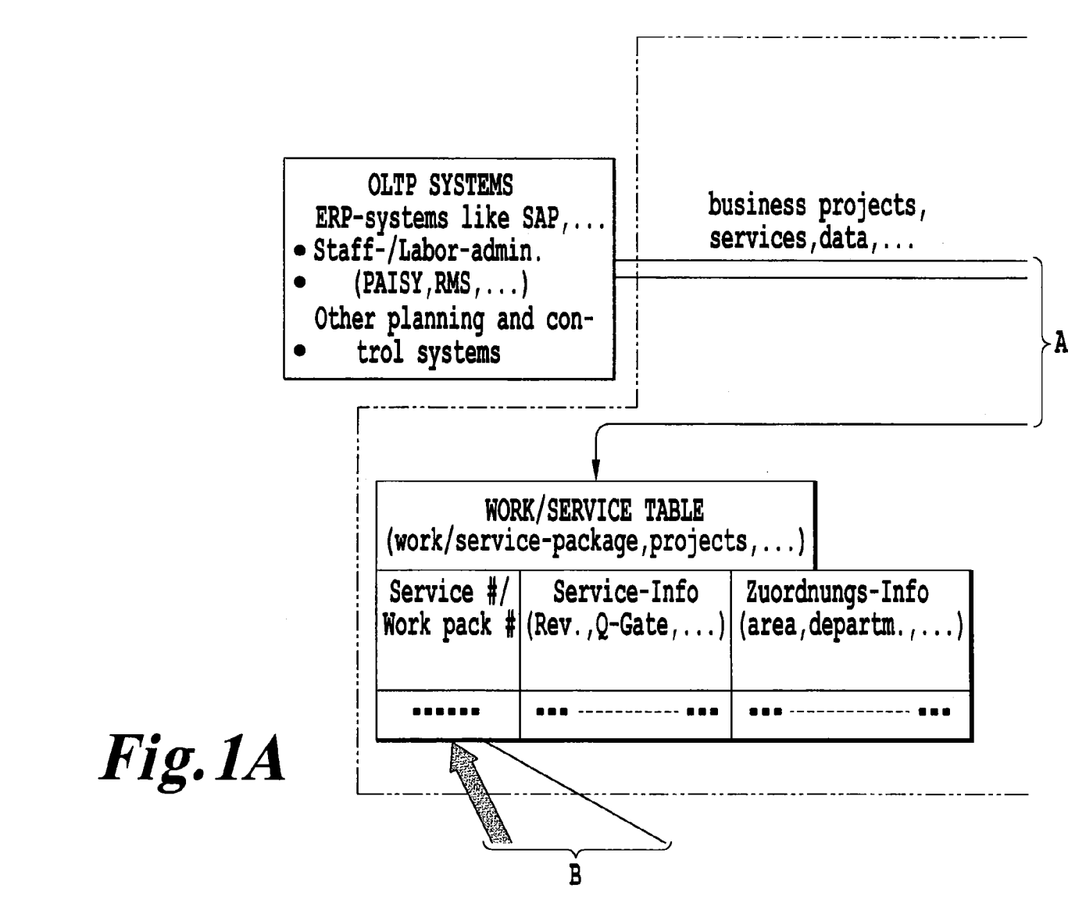
FIG. 1A shows a portion of the architecture of one embodiment of the invention method.
Figure 1B:
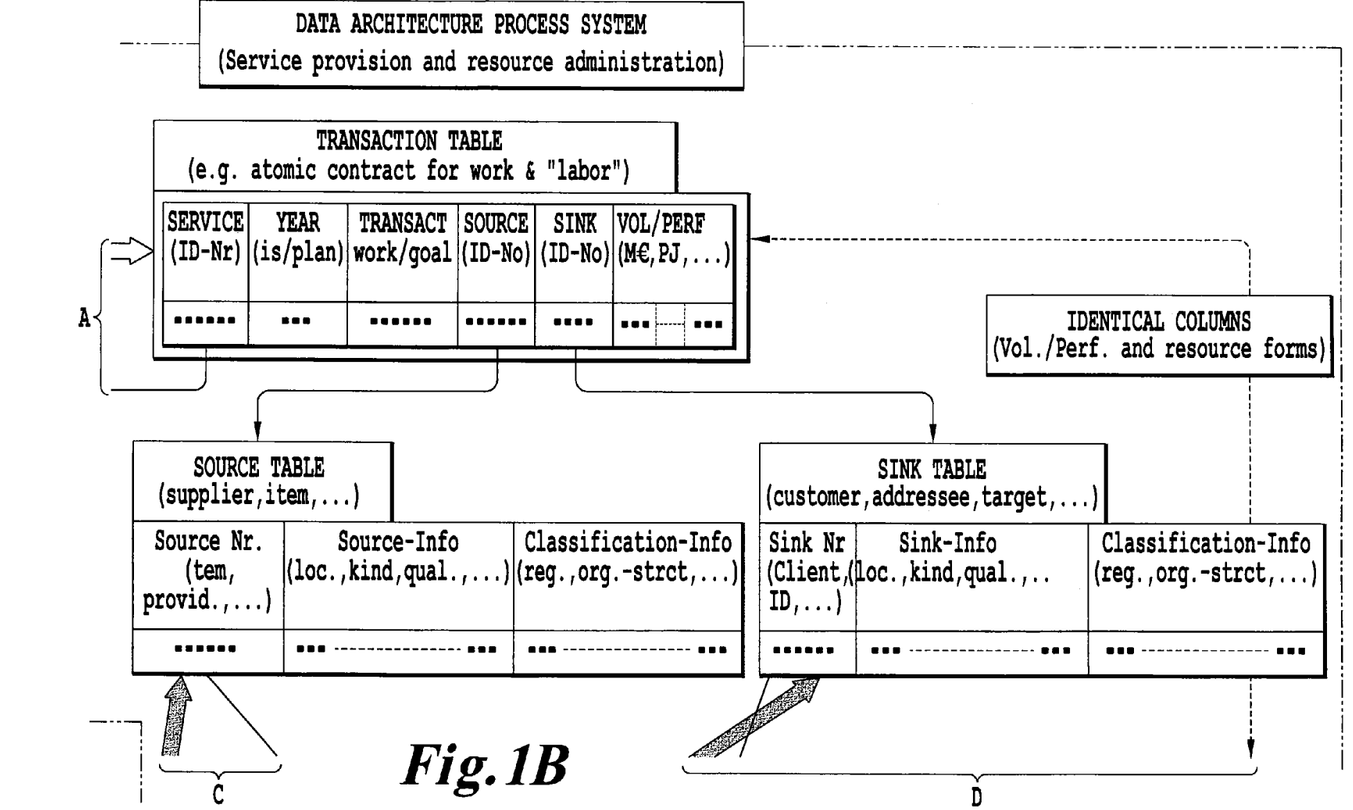
FIG. 1B shows a portion of the architecture of one embodiment of the invention method.
Figure 1C:
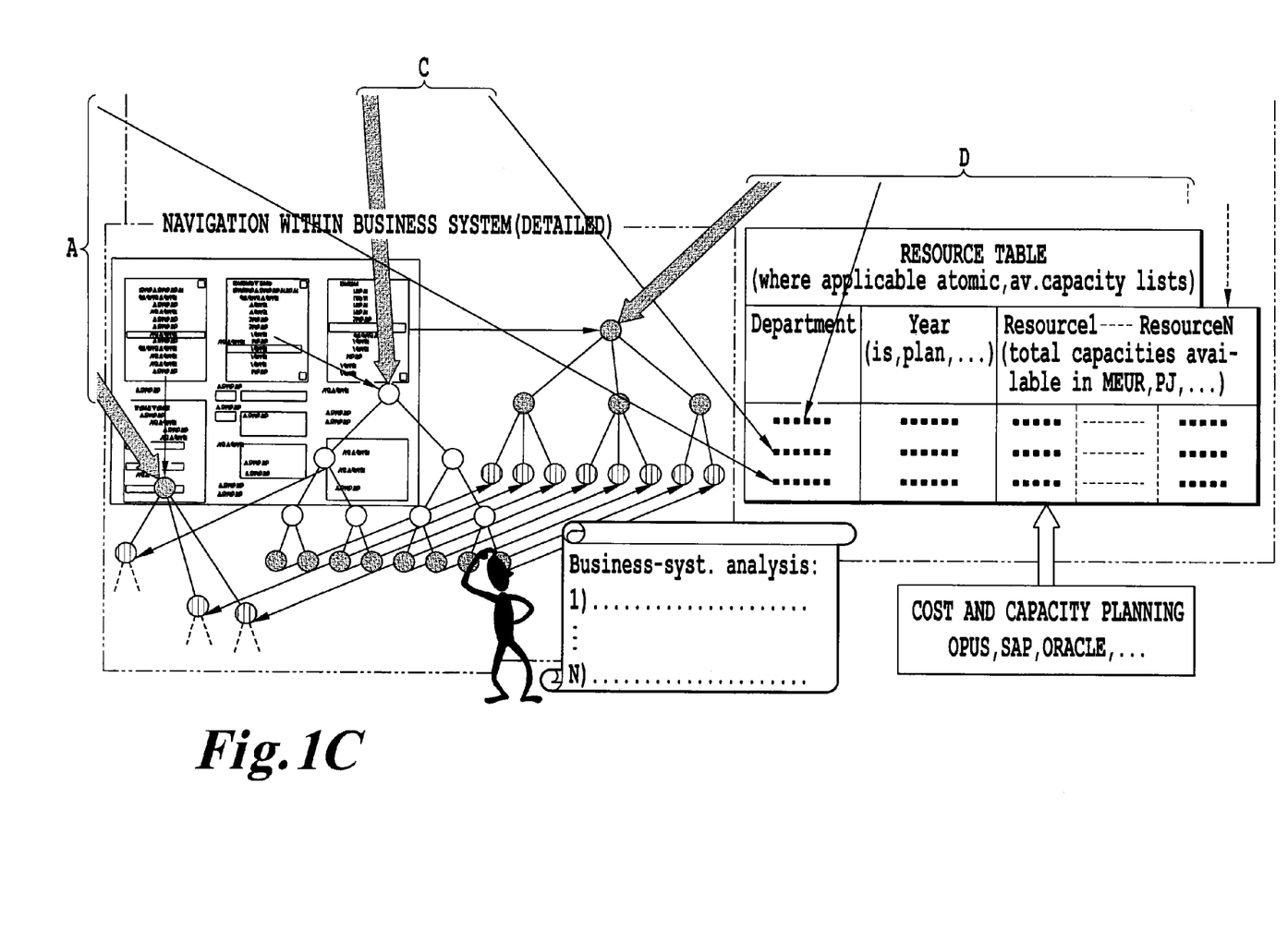
FIG. 1C shows a portion of the architecture of one embodiment of the invention method.

In the Figs. it is illustrated how the structuring of an arbitrary process system into the described for orthogonal basic dimensions (source, sink, object or service, time) permits a very simple and conveniently operable and usable electronic data-processing representation of an approximately arbitrary process system (see FIG. 1). This representation and the associated electronic data-processing system for management support therefore exhibits clear and simple-to-operate interfaces. Via these it communicates, on-line if necessary, with the business or other electronic data-processing systems supplying the data, which systems are able to observe and if necessary also control the process system to be considered (see FIG. 1).

The transaction table of FIG. 1 may be an atomic level that represents, for example, contract for work and labor. The Transaction Table may encompass levels and dimensions such as Service (ID number), year (plan), Transaction (work/goal), Source (ID number), Sink (ID number), and Volume/Performance (revenues and profits).

The Work/Service Table may represent items such as work/service-package and projects. Levels within the Work/Service Table may include fields or columns such as Service number/Work pack. Service-Info which may include items such as revenues and Q-Gate, and an allocation information column that includes items such as area and department. The Source Table corresponding to the Transaction Table may represent, for example, supplier and item. At another level may represent Source number such as item; Source-Info such as location, kind and quality; and classification info which may include regulations and organizational structure. The Sink Table associated with the Transaction Table may represent items and fields such a customer, addressee and target. The Sink Table may include several fields or levels such as sink number (client, ID, . . . ), Sink-Info (location, kind and quality), and classification info (regulation, and organizational structure for example).

Within the Resource Table (which may represent, where applicable, an atomic level of average capacity data), field and columns identifying, for example, Department Year (plan), Resource 1 . . . Resource N (total capacities available in revenues and profits).

Figure 2:
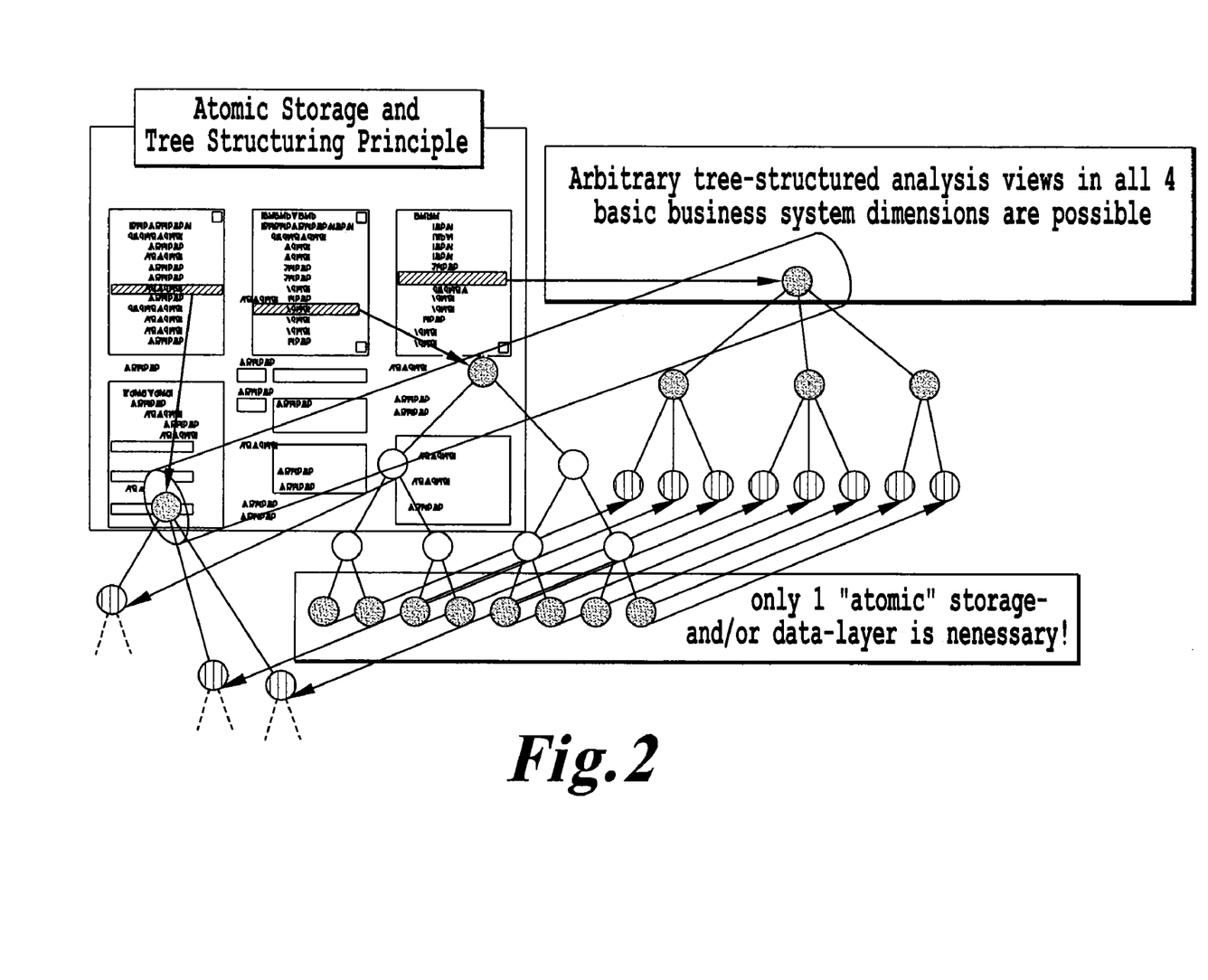
FIG. 2 shows a schematic diagram of the main data structures and their interconnectivity.

A quite particular advantage of this electronic data-processing and overall system architecture is the arbitrary (tree) structurability of each of the 4 basic dimensions of a process system. It is illustrated in FIG. 2. It permits almost arbitrary adaptability of this very simple, practically minimal (electronic data-processing) representation of a process system to real structuring features (for example, into board, division, department for a manufacturing process). This adaptation is not limited merely to the company organization alone (for example, as the "source" coordinate of the service), but is also possible in simple manner for the products or product groups (for example, as the "service" or "transaction" coordinate) and for their customers/markets (for example, as the "sink" coordinate). Furthermore, this mechanism is also possible for the "time" coordinate. This makes it very easy to conduct period or phase considerations, for example, for an arbitrary process system.

The restriction to "tree structures" is actually not a disadvantage in this regard, but more of an advantage. Because of the general validity of these data structures, this restriction can be regarded as not restricting structuring freedom at all, while because of the implicit partitioning of the consideration space it makes it possible always to establish consistency in considering the subsystem and overall system. This is generally not possible or not easily possible with other structuring principles.

Figure 3:
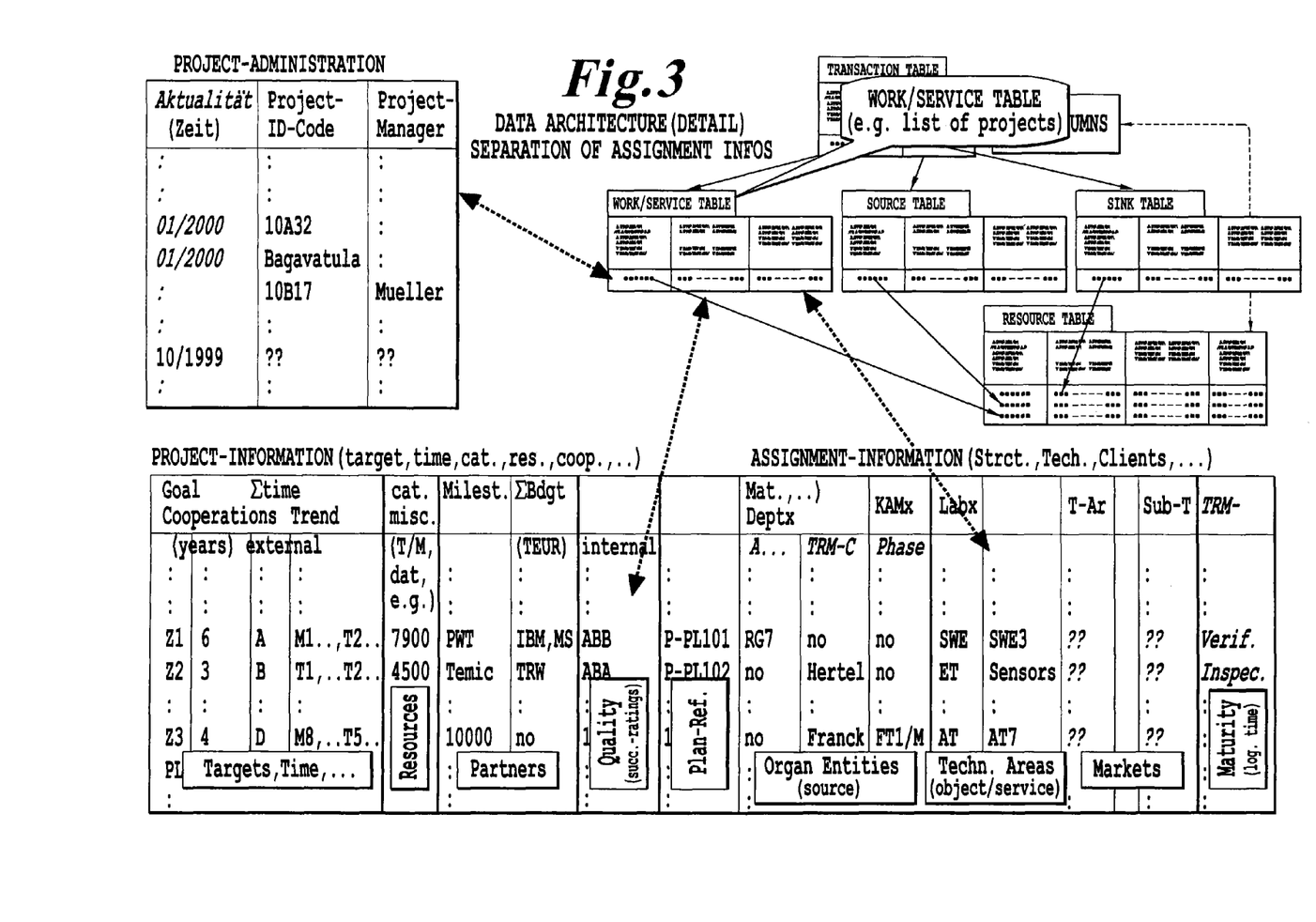
FIG. 3 shows a schematic diagram of the information architecture and structure.

FIG. 3 shows, in one embodiment, the Transaction Table, Work/Service Table, Source Table and Sink Table and Resource Table of FIG. 1 and associated columns and fields.

The greatest advantage of these principles arises due to the separation of atomic storage layers from the correlation or structuring information (see FIGS. 1, 2 and 3) for the 4 basic coordinates. Not only does this permit space-optimized storage of the information but also makes it possible to treat real and hypothetical classifications of a process system identically. Thus, without loss of general validity, speed or user friendliness, the invention makes it possible for the first time to compare real and hypothetical classifications of arbitrary process systems. In this way the (real) process system in question can be selectively optimized. In other words, the consequences of changes (such as reorganizations in corporations or in corporate divisions) can be simulated, tested and thus incrementally optimized.

FIG. 3 shows impressively how simple it is to add new and if necessary hypothetical classifications of the process system. Simple introduction of new columns into the subtable for the correlation information makes it possible to restructure the process system. All search, selection and evaluation or aggregation mechanisms otherwise previously defined for the (process) system can continue to be used. An increase of complexity in searching and evaluation also does not occur, since only the desired correlation information has to be read from the (known) new column. This is the same work needed for the original classification of the process system or of the event space. It is in this way that the described optimal time behavior and the maximum flexibility of the inventive information system become a practical reality.

Figure 4:
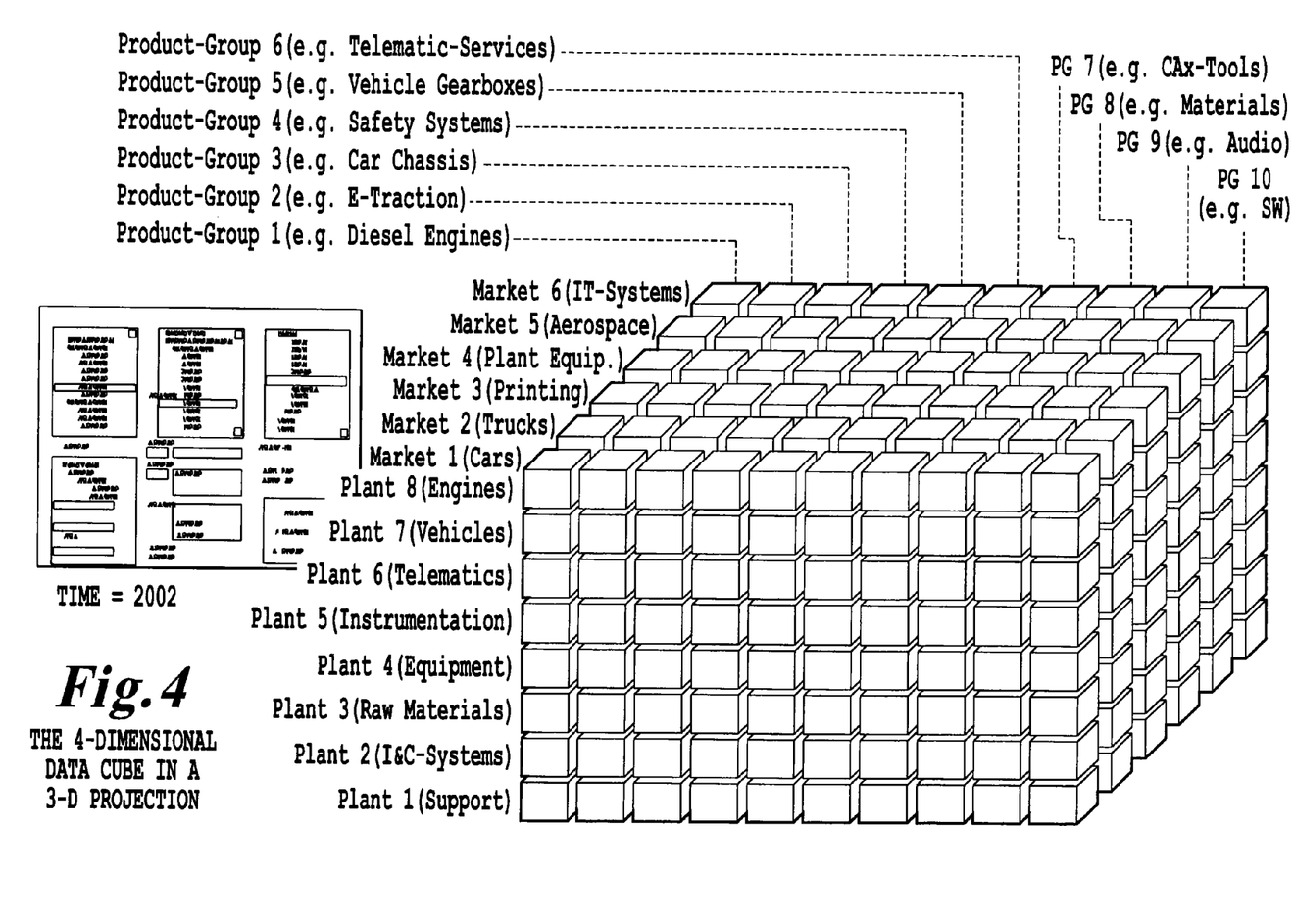
FIG. 4 shows a multi-dimensional view of the data structure.

As illustrated in FIG. 4, a corresponding convenient navigation tool permits the user, after arbitrary real or hypothetical classifications, always to consider the same 4-dimensional process-system world (the data cube) from all possible views. This is also true for arbitrary partial views, as is illustrated in FIG. 4 on the example of a real development process or a real development division. The same is also true for almost arbitrary aggregations of the same process system to new subsystems if necessary or to overall systems (see also FIG. 3 which shows aggregations of data and/or data fields in the Tables identified as Project-Information and Assignment-Information). Thus the invention represents a practically optimal "simulation environment" for selective structuring and optimization of almost arbitrary process systems.

Figure 5:
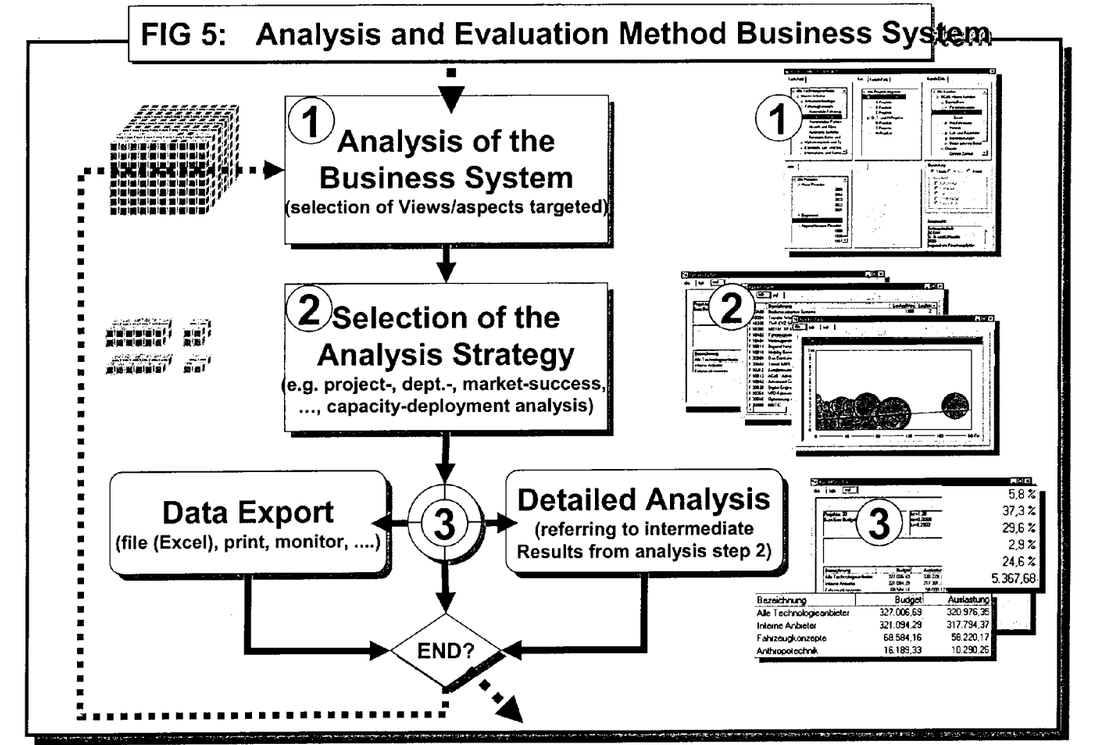
FIG. 5 shows a block diagram of the analytical flow of a process system.

To this very simple flow there also corresponds the flow control of an overall analysis of a process system (see FIG. 5). The highly modular structure of the invention distinguishes strictly between selection of the "view of the process system—the "navigation view", for which there is even provided a specific support tool ("navigator")—and the actual analysis of the selected section of the process system itself. This modularity principle makes it possible to use arbitrary analysis methods and also assessment metrics for the section to be considered and thus also to compare them with one another.

This is a decisive advantage, especially for application in real R&D, manufacturing and distribution processes. For this purpose there are used very diverse and sometimes also very different assessment metrics. With this premise, the set of assessment methods that can be used for analysis and optimization of a process system is limited only by the imagination. Thus the invention represents approximately the "most general process-system analyzer". This is a quite decisive advantage precisely in the art of management information systems, without actually confirmed and generally valid control, measurement, evaluation and optimization methods.

Figure 6:
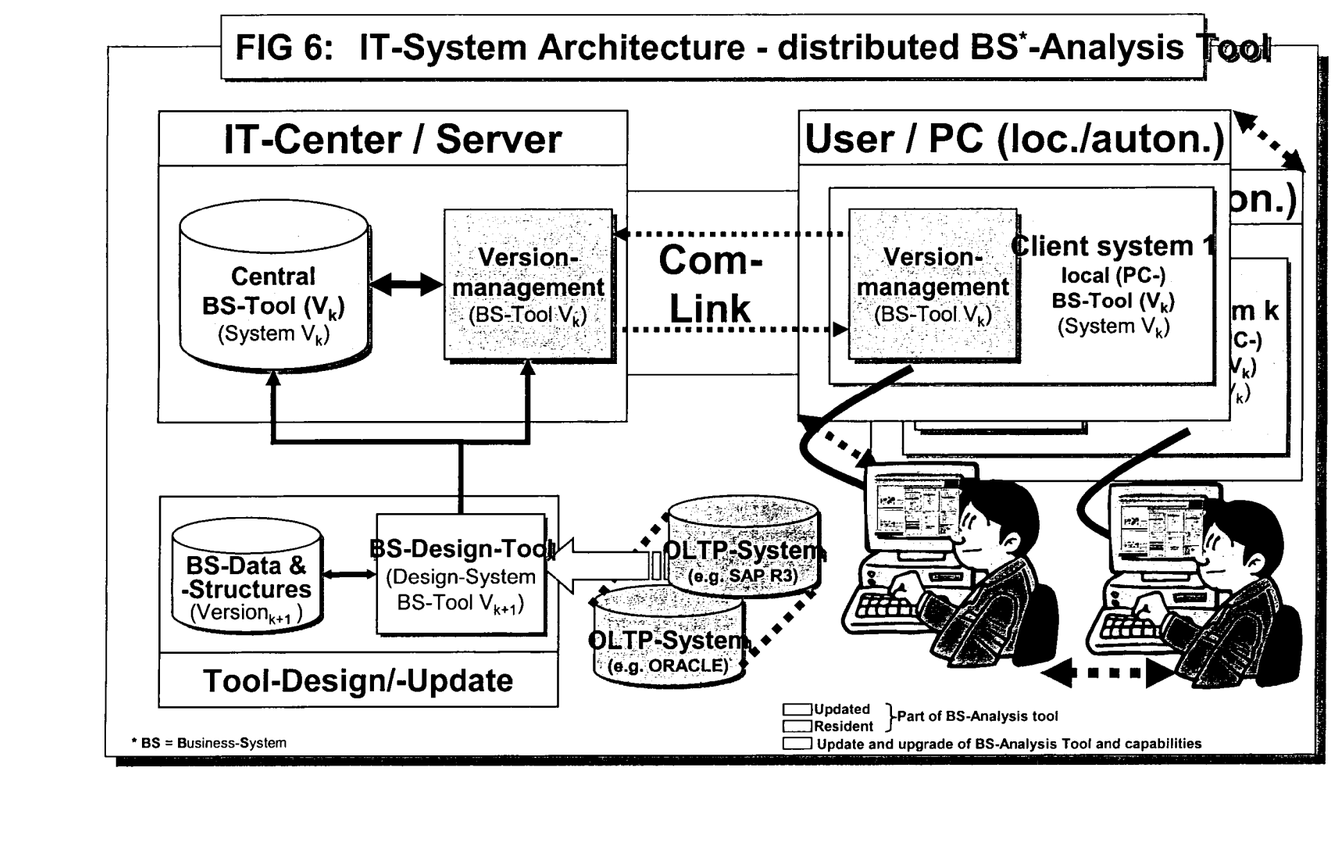
FIG. 6 shows a distributed information system of the invention with a central development system.

However, the 4-dimensional basic classification, the atomic data recording and the tree-classified structuring of the process system or of the electronic data-processing system have yet another (modularization) advantage that is also very helpful and important for practical use. They make it possible consistently to decompose the overall system into subsystems and if necessary to reassemble it once again. This in turn makes it possible to consider sections of a process system in an analogous classification as autonomous subsystems and also to edit them on separate electronic data-processing units (such as PC systems), as is illustrated in FIG. 6 and identified as the "User/PC (loc./auton.). Thus the associated business or management information system of the company is PC-compatible and thus portable, as it were, for applications in control of manufacturing or distribution processes. If the users confine themselves to pure analysis purposes under these conditions, no problems whatsoever result. If data are also modified, however, appropriate conflict-resolution mechanisms and algorithms must be made available later by the central system or by the system administrator. In any case, the operator convenience and usability of such systems are considerably increased. This is true in particular in direct comparison to the currently prevailing mainframe computer systems such as SAP, etc.

Figure 7:
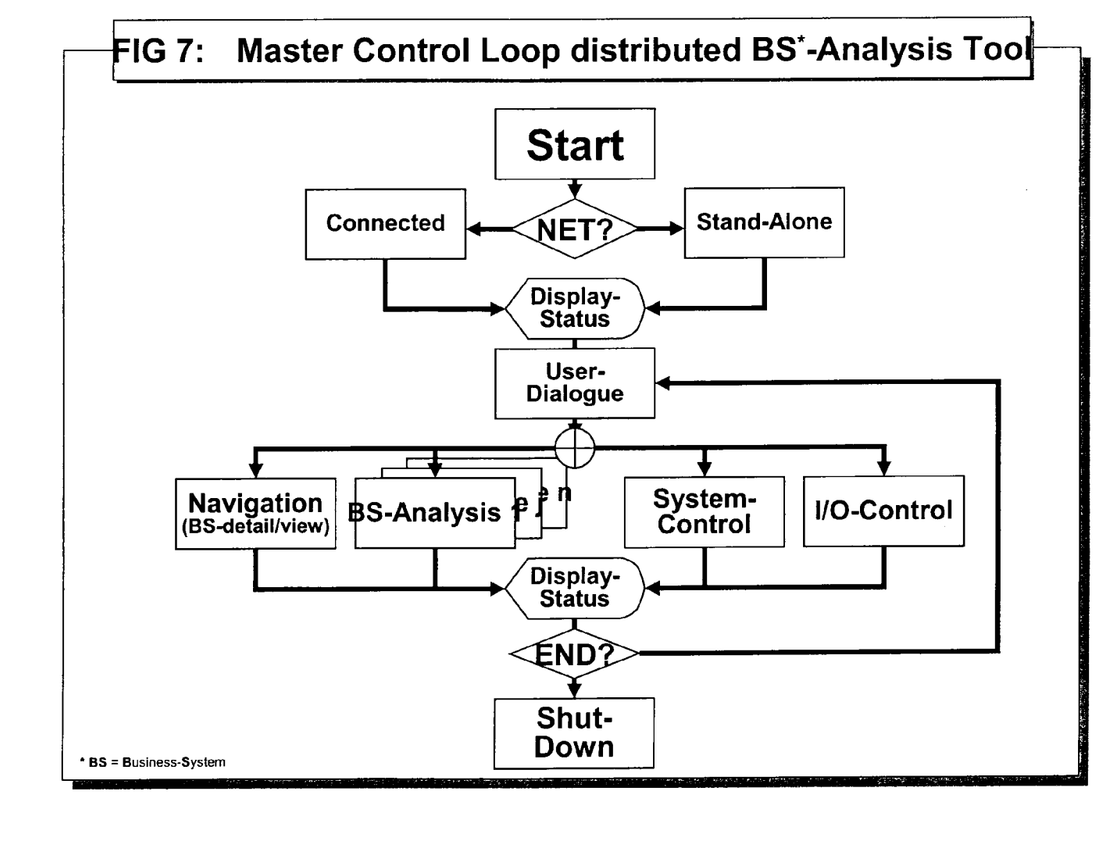
FIG. 7 shows the check loop and check architecture that may be used in a distributed management information system.

To this approach and this philosophy there also corresponds the flow control of the overall system as illustrated in FIG. 7. It permits working with equal rights under both network and "stand-alone" conditions (such as on a PC or laptop). Likewise, several analyses can be run in parallel, since each analysis can draw on its own "store" (the sub-data cube in FIG. 4 or FIG. 5). This permits heretofore unknown free room to perform multiple and comparative analysis, for example over several years (see FIGS. 5 and 7).

The described method for multi-year analysis and control of process systems can be loaded as a computer-program product directly into the internal memory of a computer.

The method is also available as a computer-program product, which is stored on a computer-compatible medium and has computer-readable programming means that instruct the computer to carry out the method for analysis and control of process systems, over multiple years if necessary (see FIGS. 5 to 8).

FIG. 1 shows, with the individual basic tables, the described data architecture of the method. On the example of a development process or of a development division, it shows the essential main interfaces to the existing electronic data-processing systems for planning and controlling as well as the interface to the navigation tool and to the navigation and structure data of an associated, inventive electronic data-processing system. The interaction with the (external) business systems (for example, OLTP systems such as SAP or time-recording systems such as RMS, etc.) takes place mainly via the transaction table on the "atomic" transactions layer. In this example, such transactions can be individual services, trades or even delivered subsystems, etc. The second layer of interaction with the surrounding electronic data-processing systems for operational or production control or, in this example for development control, is the resource table. In this table there is exactly described, for each atomic (structure) unit of the process system to be controlled (in this case an R&D division), how many of each required resource are available, in which time space and to whom (in other words, which unit or "basic coordinate"). The "basic coordinates" of the process system, in this case the R&D system or division, are described in the 3 tables "service" or product or "transaction type", source (and therefore laboratory or R&D department, for example, in this case) and sink (and therefore customer, market or consumer of the R&D result in this case). All of these basic coordinates and the time are classified in tree form. Under these conditions, a convenient tool, the "navigator" (see FIG. 2 which shows drop down menus of a graphical user interface) permits the user to select the process-system part to be analyzed in a manner that is just as simple as it is complete and detailed.

FIG. 2 shows, as a schematic diagram and as a possible operator interface in the analysis step "selection of the process-system view", the main data structures of the navigation tool or of the navigation tables as well as their logical connection with the atomic storage layer. For this purpose, each "coordinate" (service, source, sink and time) is always stored and represented in tree-structured form. This makes it possible always to keep the overall process system and the respective section under consideration in view simultaneously and equally well. The tree structuring further makes it possible, already at the selection time point, always to correlate the correct atomic information units with each (higher-level) structure or classification unit (see correlation information in FIG. 3 which show the Structure/Service Table, the Source Table, and the Sink Table). In this way there is eliminated almost the entire search work, which generally grows exponentially with complexity, for procurement of the required analysis or control information.

FIG. 3 shows in detail, as a schematic diagram, on the example of the information about the R&D system chosen as a process example, which information is stored in the "object/service" table/basic coordinate, a possible implementation of the inventive data architecture and structure. In this case, the separation of inventory (for example, contents, time, etc.) and structure information (for example, about organization, technology, markets or maturity segment or time segment) makes it possible to represent, analyze, assess and simulate any arbitrary real and hypothetical classification/structure simultaneously. Since all data are filed on an atomic (storage) layer, they can also be systematically aggregated in a manner corresponding to the filed real/hypothetical classification (see also FIG. 1 which shows the real/hypothetical classification in, for example, the Transaction Table as the third column in each of the Structure/Service Table, the Source Table, and the Sink Table, and FIG. 2 which shows the real/hypothetical classifications as nodes of the layers of a hierarchical structure). The insertion of merely one new/further column in the correlation information (such as "laboratories" for the source or organization coordinate) is synonymous with the introduction of a new and if necessary even hypothetical classification of the process system under consideration. The number of rows and thus the scope of the stored (factual) information is unaffected by this. The search complexity also is not increased, since the correlation information is always already made known to the "navigator" at the time point of selection of the section or of the view of the process system. Thus it can directly address the relevant information and the search does not grow exponentially more complex.

Because of limitations on representation, FIG. 4 shows a selection of 3-D data as determined by a particular selected partial view of the data from the 3-dimensional or 4-dimensional "data cubes" of a process system (source=factories, object or performance=product group, sink=markets, time=the year 2002 as "hidden" parameters). By skillful selection of the "basic coordinates" of the process system and by the then possible atomic classification and hierarchical structuring of the overall "event space" of the almost arbitrary process system (which in this case is based on the example of a manufacturing process for vehicles and aircraft), it is possible, despite arbitrarily diverse structurability of each coordinate, to maintain constant the overall complexity that the electronic data processing sees, as it were (for example, in searching for information).

FIG. 5 shows, as a block diagram, a typical analysis flow for an arbitrary process system. The screen shots at the side show possible selection menus and results of this analysis on the example of a (real) R&D process or division, which was analyzed with an inventive tool. As expected, the response times in this case were largely independent of the scope and complexity of the classification of the process system, in this case the real and hypothetical classifications of the R&D system. In the first process step, "analysis of process system" that part of the process system to be considered as relevant for the analysis (in this case R&D system) is identified. By means of the information found in the navigator (see FIG. 2), all relevant atomic storage sites (table elements, see also FIG. 3 which shows table elements as individual entries in columns of the tables such as the table labeled Project-Administration which contains entries such as "Mueller") are then identified and selected. It is only on this data set, which is generally much smaller, that the operations of the analysis or control task that may be desired are then performed. This therefore takes place on the most favorable and minimal data set (from the viewpoint of information technology). Since, viewed logically, this data set is merely a further inventive data cube, it is possible to also undertake further, arbitrary data analyses or data outputs with this data cube, for further processing in a third process step.

FIG. 6 shows, as a block diagram, the/a possible configuration of an inventive distributed information system with a central and development system. This almost ideally modular overall system structure is possible only because the recursive data and process architecture of the inventive electronic data-processing tool or system mean that every partial view and every subsystem is always "structurally identical" to the overall system. This in turn permits the (largely) automated assembly of partial results and subsystems into a higher-level overall system or electronic data-processing tool.

FIG. 7 shows the check loop and check architecture that is possible or necessary for such a distributed management information system. In the first working step, it is examined whether the inventive (PC) subsystem is situated in a network. If this is the case, the currently existing state of the overall system, or in other words the tables and navigation tools (see also FIGS. 1, 2 and 3) of the overall system or of the network system are loaded into the local memory. Otherwise the currently most up-to-date stored version of the system is used. After this point, the check loop flows identically for both cases (autonomous or network operation). This dramatically simplifies the overall system design of an inventive electronic data-processing system. The steps "select process system" ( ⇔ "navigator" call), "select analysis method" (⇔ for example, process analysis 1 to N) and if necessary "detail analysis or data output" (⇔ "system control" or "I/O control") are then executed. Depending on what is desired, the sequence of working steps is then continued in a loop or ended.

Figure 8:
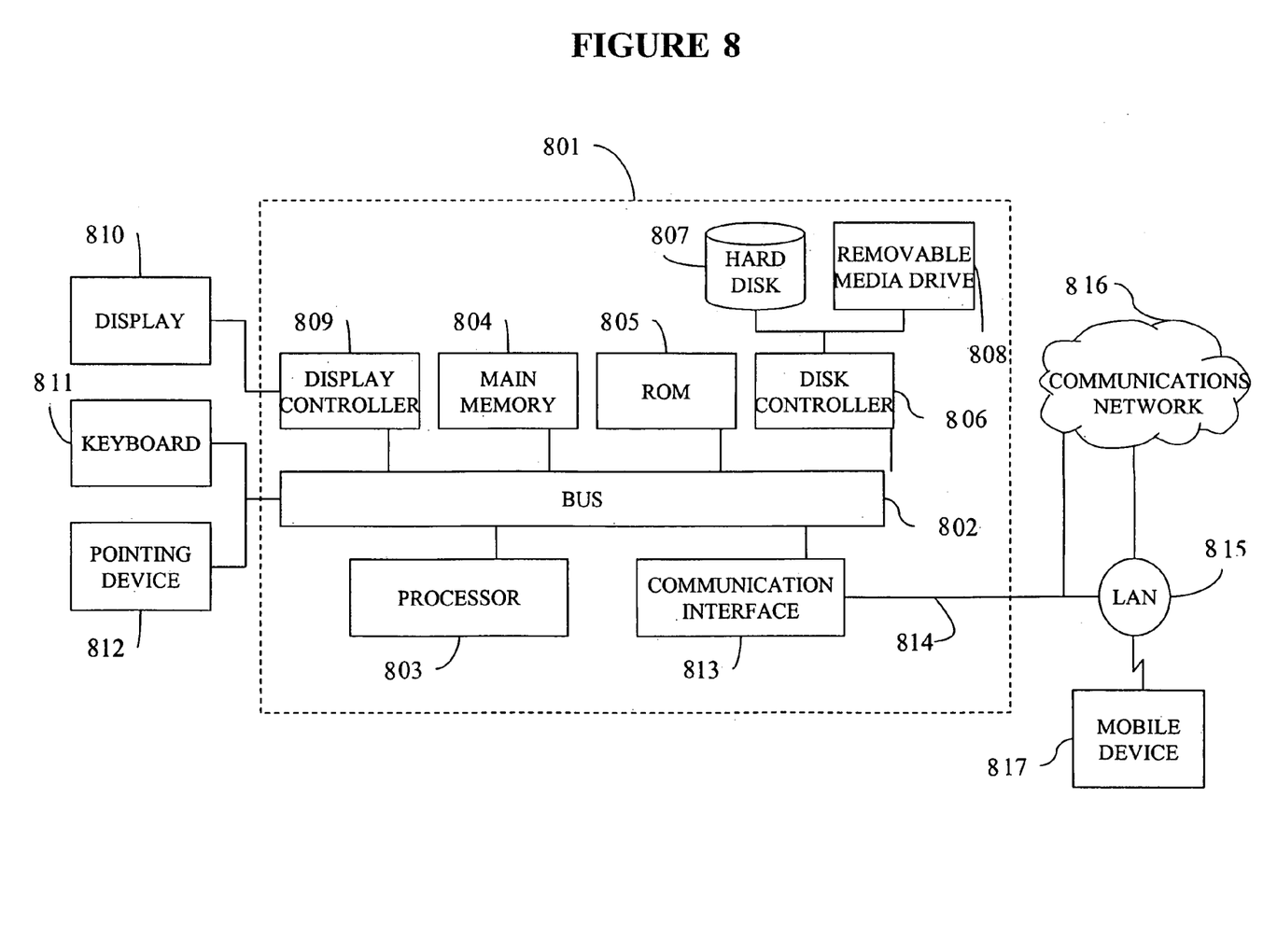
FIG. 8 illustrates a computer system upon which an embodiment of the invention may be implemented.

FIG. 8 illustrates a computer system 801 upon which an embodiment of the present invention may be implemented. The computer system 801 includes a bus 802 or other communication mechanism for communicating information, and a processor 803 coupled with the bus 802 for processing the information. The computer system 801 also includes a main memory 804, such as a random access memory (RAM) or other dynamic storage device (e.g., dynamic RAM (DRAM), static RAM (SRAM), and synchronous DRAM (SDRAM)), coupled to the bus 802 for storing information and instructions to be executed by processor 803. In addition, the main memory 804 may be used for storing temporary variables or other intermediate information during the execution of instructions by the processor 803. The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 801 may also include a display controller 809 coupled to the bus 802 to control a display 810, such as a cathode ray tube (CRT), for displaying information to a computer user. The computer system includes input devices, such as a keyboard 811 and a pointing device 88, for interacting with a computer user and providing information to the processor 803. The pointing device 812, for example, may be a mouse, a trackball, or a pointing stick for communicating direction information and command selections to the processor 803 and for controlling cursor movement on the display 810. In addition, a printer may provide printed listings of data stored and/or generated by the computer system 801.

The computer system 801 performs a portion or all of the processing steps of the invention in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 801, for driving a device or devices for implementing the invention, and for enabling the computer system 801 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 803 for execution. A computer readable medium may take many forms, including but not limited to, non-volatile media, volatile media, and transmission media. Non-volatile media includes, for example, optical, magnetic disks, and magneto-optical disks, such as the hard disk 807 or the removable media drive 808. Volatile media includes dynamic memory, such as the main memory 804. Transmission media includes coaxial cables, copper wire and fiber optics, including the wires that make up the bus 802. Transmission media also may also take the form of acoustic or light waves, such as those generated during radio wave and infrared data communications.

Various forms of computer readable media may be involved in carrying out one or more sequences of one or more instructions to processor 803 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 801 may receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 804, from which the processor 803 retrieves and executes the instructions. The instructions received by the main memory 804 may optionally be stored on storage device 807 or 808 either before or after execution by processor 803.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a network interface card to attach to any packet switched LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc). The signals through the various networks and the signals on the network link 814 and through the communication interface 813, which carry the digital data to and from the computer system 801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

European Patent Application EP 02015260.9 filed on Jul. 9, 2002, is incorporated herein by reference in its entirety. International Application PCT/EP2003/007447 is incorporated herein by reference in its entirety.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein and those embodiments claimed.

The invention claimed is:

1. A computer-implemented method of classifying and recording data for one or more of controlling, analyzing or simulating a research, development, manufacturing and distribution process, comprising:

mapping, in a processor of a computer, electronic data relevant for describing the process into a four-dimensional coordinate space having the orthogonal coordinate axes (i) source, (ii) sink, (iii) object or service, and (iv) time, and storing, in memory, the mapped data in a relational, object oriented or other database having a tree structure, wherein the source, sink, and object or service data along the coordinate axes, in a computer-readable code that is readable by the processor, are represented by a transaction table in which time-related information on inventory changes of data stored in the coordinate axes source, sink and object or service are recorded for logical connection during performance of an analysis or simulation, and time-related information on costs and capacities of the process is recorded in a resource table, wherein all data in each of dimensions of the four-dimensional coordinate space are collected and stored in a deepest, atomic layer stored in memory, wherein one or more tree structured partitions that are arbitrary and complete down to the deepest, atomic storage layer may be specified, set up and stored, in memory, for each dimension of the four-dimensional coordinate space, wherein all data relevant to the research, development, manufacturing and distribution processes is stored, in memory, in four dedicated data structures, of which one each is provided for the orthogonal coordinate axes source, sink, and object or service, a further data structure stores atomic transactions and if necessary an additional data structure stores resources in the three orthogonal coordinate axes source, sink, and object or service, wherein this additional data structure may be subdivided into three dedicated sub data structures or sub tables, respectively, separated for source, sink, and object or service.

2. The method according to claim 1, wherein all data relevant to the research, development, manufacturing and distribution processes is stored, in memory, in five to seven dedicated data structures and the structures are tables.

3. The method according to claim 1, wherein the structure or the correlation information of the respective atomic information units in each of the four dimensions of the four-dimensional coordinate space is stored, in memory, for arbitrary higher-level units of a real and hypothetical classification of the process, in separate data structures, the four tables corresponding to source, sink, object or service, and time.

4. The method according to claim 3, wherein the data structures are tree structures.

5. The method according to claim 1, wherein the atomic information entries are stored in four to seven data structures that may be logically connected by redirecting entries in appropriate correlation structures, to be analyzed or to be considered.

6. The method according to claim 5, wherein the correlation structures are columns.

7. The method according to claim 1, wherein the correlations of atomic transactions are stored, in memory, in hierarchical order separated from the stored electronic data of the process.

8. The method according to claim 1, wherein the stored atomic transactions in the data structure or structures and the corresponding data in the transaction table are of the same type or category.

9. The method according to claim 1, wherein the stored atomic transactions are completely stored, in memory, in the corresponding data structures so that the variation and the availability status of the corresponding resource can be determined at any time by a corresponding calculation program.

10. The method according to claim 1, further comprising: identifying, with the processor, all those atomic transactions that are relevant for an analysis or consideration by dialog between a user and a navigation tool, on the basis of the data structures, and delivering a corresponding program for extracting and aggregating the respective data.

11. The method according to claim 10, wherein data necessary for responding to an arbitrary query or analysis task may be calculated, with the processor, from the indications of the navigation tool and in this way the information can be directly accessed.

12. The method according to claim 1, wherein data necessary for responding to an arbitrary query or analysis task may be calculated from the data stored, in memory, in the data structures.

13. The method according to claim 1, further comprising: decomposing, with the processor, the overall system into arbitrary subsystems that are similar in structure to the overall system by the structure or correlation information filed in the data structures.

14. The method according to claim 13, further comprising: editing and administering the subsystems into separate electronic data-processing systems.

15. The method according to claim 14, wherein the editing and administering is carried out with one or more conflict-resolution mechanisms or systems and the subsystems can be reassembled into a consistent overall system.

16. The method according to claim 1, wherein one or more electronic data-processing-supported reporting, analysis and development or integration tools connected to one another and the processor, and cooperating with one another, monitor and control the overall flow.

17. A computer-program product that can be directly loaded into the internal memory of a computer and that comprises software modules with which a method according to claim 1 is implemented for analysis and control of processes.

18. A computer-program product that is stored on a computer-compatible medium and that is provided with computer-readable programming means, which instruct the computer to implement a method according to claim 1 for analysis and control of the process.

* * * * *